(12) United States Patent
Watanabe et al.

(10) Patent No.: US 10,312,538 B2
(45) Date of Patent: Jun. 4, 2019

(54) FUEL CELL SYSTEM FOR VEHICLE AND CONTROL METHOD THEREOF

(71) Applicant: TOYOTA JIDOSHA KABUSHIKI KAISHA, Toyota-shi, Aichi-ken (JP)

(72) Inventors: Takao Watanabe, Nagakute (JP); Shinji Aso, Toyota (JP); Akihiro Kamiya, Toyota (JP); Tomoya Ogawa, Okazaki (JP); Junichi Matsuo, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/843,377

(22) Filed: Dec. 15, 2017

(65) Prior Publication Data

US 2018/0198145 A1  Jul. 12, 2018

(30) Foreign Application Priority Data

Jan. 11, 2017 (JP) .................. 2017-002671

(51) Int. Cl.
| | | |
|---|---|---|
| *H01M 16/00* | (2006.01) | |
| *H01M 8/04992* | (2016.01) | |
| *H01M 8/04858* | (2016.01) | |
| *H01M 8/04828* | (2016.01) | |
| *B60L 11/18* | (2006.01) | |
| *H02P 29/40* | (2016.01) | |

(52) U.S. Cl.
CPC ..... *H01M 8/04992* (2013.01); *B60L 11/1887* (2013.01); *H01M 8/04932* (2013.01); *H01M 8/04947* (2013.01); *H01M 16/006* (2013.01); *B60L 2240/42* (2013.01); *H01M 2220/20* (2013.01); *H01M 2250/20* (2013.01); *H01M 2250/402* (2013.01); *H02P 29/40* (2016.02); *Y02B 90/12* (2013.01); *Y02T 10/642* (2013.01); *Y02T 90/32* (2013.01); *Y02T 90/34* (2013.01)

(58) Field of Classification Search
CPC ............. B60L 11/002; B60L 3/12; B60L 7/12
See application file for complete search history.

(56) References Cited

U.S. PATENT DOCUMENTS

2011/0014533 A1* 1/2011 Jennings ........... H01M 8/04619
429/428
2012/0248872 A1* 10/2012 Saeki .................. H01M 8/0494
307/48
2018/0123152 A1* 5/2018 Matsumoto ....... H01M 8/04223

FOREIGN PATENT DOCUMENTS

JP 2009-104833 5/2009
JP 2016-115605 6/2016

* cited by examiner

*Primary Examiner* — Bickey Dhakal
*Assistant Examiner* — Charles S Laughlin
(74) *Attorney, Agent, or Firm* — Finnegan, Henderson, Farabow, Garrett & Dunner, LLP

(57) ABSTRACT

A fuel cell system for a vehicle includes: a fuel cell; a plurality of loads that consumes power generated by the fuel cell and includes a vehicle driving motor; a secondary battery configured to be charged with excess power when an amount of power generated by the fuel cell is greater than an amount of power consumed by the loads and to discharge shortage power when the amount of power generated by the fuel cell is less than the amount of power consumed by the loads; and a control unit configured to control the amount of power generated by the fuel cell such that an amount of charging-discharging power of the secondary battery is maintained at a predetermined value.

4 Claims, 6 Drawing Sheets

FUEL CELL SYSTEM FOR VEHICLE AND CONTROL METHOD THEREOF

INCORPORATION BY REFERENCE

The disclosure of Japanese Patent Application No. 2017-002671 filed on Jan. 11, 2017 including the specification, drawings and abstract is incorporated herein by reference in its entirety.

BACKGROUND

1. Technical Field

The disclosure relates to a fuel cell system for a vehicle and a control method thereof and more particularly to a fuel cell system for a vehicle including a fuel cell and a secondary battery and a control method thereof.

2. Description of Related Art

In general, a fuel cell system for a vehicle includes a secondary battery in preparation for a variation in an amount of power consumed by a vehicle driving motor and other loads. A lithium-ion battery or a nickel-hydride battery is known as the secondary battery. There is a likelihood that the secondary battery will deteriorate, that is, the performance of the secondary battery will be reduced, due to overcharging or overdischarging. Accordingly, as disclosed in Japanese Unexamined Patent Application Publication No. 2009-104833 (JP 2009-104833 A), a power value (a command power value of a fuel cell) which should be generated by a fuel cell is determined according to a variation in a required power value required for a load.

SUMMARY

The inventors have found the following possibilities in a fuel cell system for a vehicle including a fuel cell and a secondary battery. FIG. 5 is a control block diagram of a fuel cell system for a vehicle according to the related art of the disclosure. The fuel cell system for a vehicle illustrated in FIG. 5 includes a fuel cell FC and a secondary battery BAT which are power supply sources and a control unit ECU that controls an amount of power generated by the fuel cell FC. The fuel cell system for a vehicle includes a vehicle driving motor MG, an air compressor ACP that supplies the fuel cell FC with air which is a fuel gas, a water pump WP that supplies the fuel cell FC with a coolant, a hydrogen pump HP that supplies the fuel cell FC with hydrogen which is a fuel gas, an air conditioner, a light, and other auxiliary machines AUX as loads that consume electric power.

As illustrated in FIG. 5, a total amount of consumed power $P_{out}$ is equal to a sum of a consumed power value pmg_ex of the motor MG, a consumed power value pacp_ex of the air compressor ACP, a consumed power value pwp_ex of the water pump WP, a consumed power value php_ex of the hydrogen pump HP, and a consumed power value paux_ex of the auxiliary machines AUX and is expressed by Equation 1.

$$P_{out}=pmg\_ex+pacp\_ex+pwp\_ex+php\_ex+paux\_ex \quad \text{Equation 1}$$

On the other hand, an amount of generated power $P_{in}$ generated by the fuel cell FC is equal to a generated power value pfc_ex of the fuel cell FC as expressed by Equation 2.

$$P_{in}=pfc\_ex \quad \text{Equation 2}$$

An amount of charging-discharging power $P_{BAT}$ of the secondary battery BAT is a difference between the total amount of consumed power Pout and an amount of generated power $P_{in}$ of the fuel cell FC as expressed by Equation 3. Shortage power is discharged from the secondary battery when the amount of charging-discharging power $P_{BAT}$ has a positive value, and excess power is charged into the secondary battery BAT when the amount of charging-discharging power $P_{BAT}$ has a negative value.

$$P_{BAT}=P_{out}-P_{in} \quad \text{Equation 3}$$

In order to minimize deterioration of the secondary battery BAT, the amount of charging-discharging power $P_{BAT}$ of the secondary battery BAT needs to be maintained between a discharging power limit value Wout and a charging power limit value Win. Accordingly, the control unit ECU generates a command power value pfc_cm of the fuel cell FC and controls power generation of the fuel cell FC such that the amount of charging-discharging power $P_{BAT}$ of the secondary battery BAT is maintained at a predetermined value. Specifically, as illustrated in FIG. 5, the command power value pfc_cm of the fuel cell FC is obtained by subtracting a command power value $p_{bat}$_cm of the secondary battery BAT from the sum of the command power values of the loads and is expressed by Equation 4. The command power value $p_{bat}$_cm of the secondary battery BAT is determined by the control unit ECU such that a state of charge (SOC) of the secondary battery BAT is maintained within a predetermined range and fuel efficiency is optimized.

$$pfc\_cm=pmg\_cm+pacp\_cm+pwp\_cm+php\_cm+paux\_cm-pbat\_cm \quad \text{Equation 4}$$

Here, when the consumed power values (pmg_ex and the like) of the loads match the command power values (pmg_cm and the like), Equation 1 can be rewritten as Equation 5.

$$P_{out}=pmg\_cm+pacp\_cm+pwp\_cm+php\_cm+paux\_cm \quad \text{Equation 5}$$

Similarly, when the generated power value pfc_ex of the fuel cell FC matches the command power value pfc_cm, Equation 2 can be rewritten as Equation 6.

$$\begin{aligned}P_{in} &= pfc\_cm \\ &= pmg\_cm+pacp\_cm+pwp\_cm+php\_cm+paux\_cm-pbat\_cm\end{aligned} \quad \text{Equation 6}$$

When $P_{out}$ of Equation 5 and $P_{in}$ of Equation 6 are substituted into Equation 3, Equation 7 is obtained.

$$P_{BAT}=P_{out}-P_{in}=pbat\_cm \quad \text{Equation 7}$$

That is, since the amount of charging-discharging power $P_{BAT}$ of the secondary battery BAT matches the command power value $p_{bat}$_cm, the amount of charging-discharging power $P_{BAT}$ can be maintained between the discharging power limit value Wout and the charging power limit value Win.

However, actually, the consumed power values (for example, pmg_ex) of the loads do not match the command power values (for example, pmg_cm). FIG. 6 is a graph illustrating response characteristics of the motor MG and illustrates the command power value pmg_cm and the consumed power value pmg_ex for comparison. The horizontal axis represents time(s) and the vertical axis represents power value (kW).

As illustrated in FIG. 6, the command power value pmg_cm and the consumed power value pmg_ex do not match each other due to a communication delay (LAG) or a response delay at the time of rising and a difference between both values in a normal state. As a result, there is a likelihood that the amount of charging-discharging power $P_{BAT}$ of the secondary battery BAT will not be able to be maintained between the discharging power limit value Wout and the charging power limit value Win. Particularly, in a lithium-ion battery; overdischarging over the discharging power limit value Wout or overcharging over the charging power limit value Win may occur for a short time, but occur frequently to cause progression of deterioration, hi the example illustrated in FIG. 6, since the consumed power value pmg_ex of the motor MG is smaller than the command power value pmg_cm, there is a likelihood of overcharging in the secondary battery BAT. Such overcharging can occur in JP 2009-104833 A.

The disclosure provides a fuel cell system for a vehicle that can minimize overcharging or overdischarging in a secondary battery.

According to an aspect of the disclosure, there is provided a fuel cell system for a vehicle including: a fuel cell; a plurality of loads that consumes power generated by the fuel cell and includes a vehicle driving motor; a secondary battery configured to be charged with excess power when an amount of power generated by the fuel cell is greater than an amount of power consumed by the loads and to discharge shortage power when the amount of power generated by the fuel cell is less than the amount of power-consumed by the loads; and a control unit configured to control the amount of power generated by the fuel cell such that an amount of charging-discharging power of the secondary battery is maintained at a predetermined value, wherein the control unit is configured to estimate a consumed power value using a transfer function from a command power value for each of the loads, and wherein the control unit is configured to determine a command power value of the fuel cell by dividing a resultant value by a first transfer function of the fuel cell, the resultant value being obtained by subtracting a command power value of the secondary battery from a sum of the consumed power values estimated for the loads.

In the fuel cell system for a vehicle according to the aspect of the disclosure, a consumed power value is estimated from a command power value using a transfer function for each of the loads and a command power value of the fuel cell is determined dividing the resultant value by the first transfer function of the fuel cell, the resultant value being obtained by subtracting the command power value of the secondary battery from the sum of the consumed power values estimated for the loads. Accordingly, it is possible to approximate an amount of charging-discharging power of the secondary battery to the command power value. As a result, it is possible to easily maintain the amount of charging-discharging power between a discharging power limit value and a charging power limit value and to suppress overcharging or overdischarging in the secondary battery.

The control unit may be configured to compare an actual consumed power value of the motor with the estimated consumed power value of the motor and to sequentially update the transfer function of the motor. According to this configuration, it is possible to more closely approximate the amount of charging-discharging power of the secondary battery to the command power value and to further suppress overcharging or overdischarging in the secondary battery.

The control unit may be configured to compare an actual generated power value of the fuel cell with a generated power value of the fuel cell estimated using a second transfer function of the fuel cell and to sequentially update the second transfer function of the fuel cell, and to restrict an upper limit of a command power value of the motor based on the command power value of the fuel cell at a current time point and the generated power value of the fuel cell at the current time point estimated using the updated second transfer function of the fuel cell. The control unit may be configured to restrict the upper limit of the command power value of the motor based on a difference between the estimated generated power value of the fuel cell at the current time point and an ideal generated power value of the fuel cell obtained by subtracting the command power value of the secondary battery from a sum of the consumed power values estimated for the loads. According to this configuration, it is possible to suppress overdischarging in the secondary battery.

According to another aspect of the disclosure, there is provided a control method of a fuel cell system for a vehicle, the fuel cell system including a fuel cell, a plurality of loads that consumes power generated by the fuel cell and includes a vehicle driving motor, and a secondary battery configured to be charged with excess power when an amount of power generated by the fuel cell is greater than an amount of power consumed by the loads and to discharge shortage power when the amount of power generated by the fuel cell is less than the amount of power consumed by the loads, and controlling the amount of power generated by the fuel cell such that an amount of charging-discharging power of the secondary battery is maintained at a predetermined value, the control method including: estimating a consumed power value using a transfer function from a command power value for each of the loads; and determining a command power value of the fuel cell by dividing the resultant value by a transfer function of the fuel cell, the resultant value being obtained by subtracting a command power value of the secondary battery from a sum of the consumed power values estimated for the loads.

In the control method of the fuel cell system for a vehicle according to the aspect of the disclosure, a consumed power value is estimated from a command power value using a transfer function for each of the loads and a command power value of the fuel cell is determined by dividing the resultant value by the transfer function of the fuel cell, the resultant value being obtained by subtracting the command power value of the secondary battery from the sum of the consumed power values estimated for the loads. Accordingly, it is possible to approximate an amount of charging-discharging power of the secondary battery to the command power value. As a result, it is possible to easily maintain the amount of charging-discharging power between a discharging power limit value and a charging power limit value and to suppress overcharging or overdischarging in the secondary battery.

According to the disclosure, it is possible to provide a fuel cell system for a vehicle that can suppress overcharging or overdischarging in a secondary battery.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, exemplary embodiments of the disclosure will be described in detail with reference to the accompanying drawings. The disclosure is not limited to the embodiments. For the purpose of clear explanation, the following description and the drawings are appropriately simplified.

First Embodiment

Figure 1:
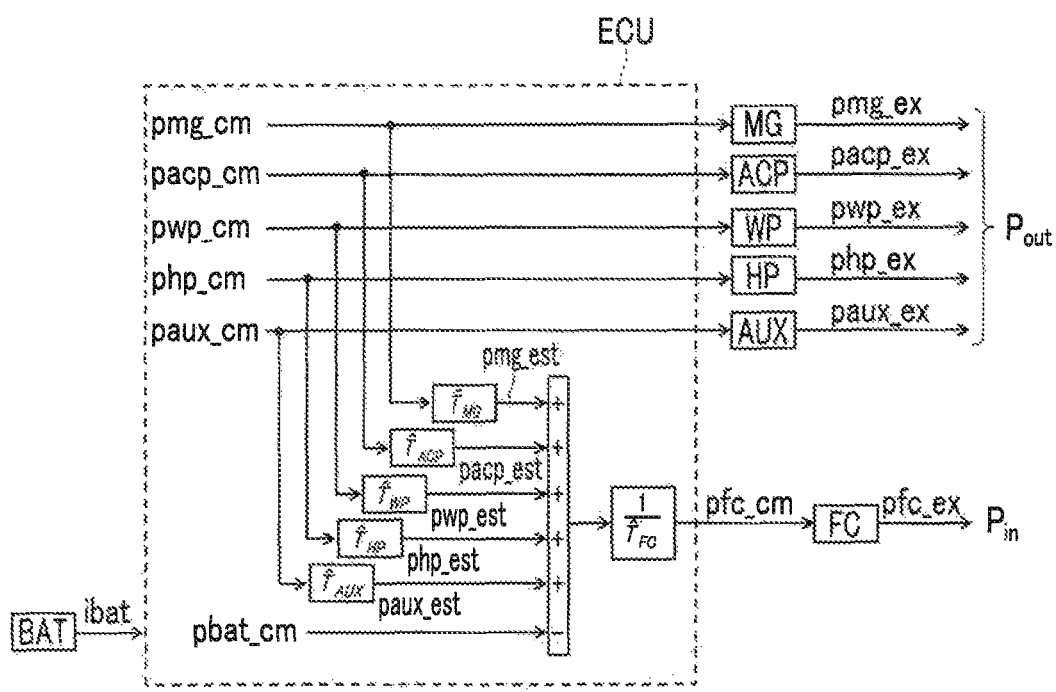
FIG. 1 is a control block diagram of a fuel cell system for a vehicle according to a first embodiment.

A fuel cell system for a vehicle according to a first embodiment will be described below with reference to FIG. 1. FIG. 1 is a control block diagram of the fuel cell system for a vehicle according to the first embodiment.

As illustrated in FIG. 1, the fuel cell system for a vehicle according to the first embodiment is, for example, a fuel cell system for a fuel-cell vehicle and includes a fuel cell FC, a secondary battery BAT, and a control unit ECU. The fuel cell system for a vehicle includes a motor MG, an air compressor ACP, a water pump WP, a hydrogen pump an air conditioner, a light, and other auxiliary machines AUX as loads that consume power generated by the fuel cell FC. The fuel-cell vehicle travels by driving the vehicle-driving motor MG with the power generated by the fuel cell FC.

The fuel cell FC is a solid polymer electrolyte type fuel cell and includes a cell stack in which a plurality of unit cells is stacked. Here, each unit cell includes a membrane-electrode assembly (MEA) in which a polymer electrolyte membrane is interposed between an anode electrode and a cathode electrode and a pair of separators between which the MEA is interposed. The fuel cell FC generates power through an oxidation-reduction reaction of oxygen gas in air supplied via the separator on the cathode side and hydrogen gas supplied via the separator on the anode side.

The secondary battery BAT is charged with excess power when an amount of power generated by the fuel cell FC is greater than an amount of power consumed by the loads such as the motor MG. The secondary battery BAT discharges shortage power when the amount of power generated by the fuel cell FC is less than the amount of power consumed by the loads. Examples of the secondary battery BAT include a lithium-ion battery and a nickel-hydride battery.

The control unit ECU is, for example, an electronic control unit (ECU) and controls an amount of power generated by the fuel cell FC such that an amount of charging-discharging power of the secondary battery BAT is maintained at a predetermined value. Although not illustrated in FIG. 1, the control unit ECU includes, for example, a processor such as a central processing unit (CPU) and a storage unit such as a random access memory (RAM) and a read only memory (ROM) in which various control programs or data are stored. Details of control which is performed by the control unit ECU will be described later.

The motor MG is a vehicle driving motor-generator and consumes most of the power generated by the fuel cell FC during traveling. The air compressor ACP takes in and compresses air which is a fuel gas from outside of the system and supplies the compressed air to the fuel cell FC. The water pump WP is a pump that circulates a coolant for cooling the fuel cell FC. The hydrogen pump HP supplies hydrogen which is a fuel gas from a hydrogen gas tank which is not illustrated to the fuel cell FC.

Details of control which is performed by the control unit ECU will be described below. As illustrated in FIG. 1, the motor MG is driven in accordance with a command power value pmg_cm output from the control unit ECU and consumes power of a consumed power value pmg_ex. Accordingly, when a true transfer function $T_{MG}$ of the motor MG is used, pmg_ex=$T_{MG}$·pmg_cm is established. However, since the true transfer function is not acquired, an estimated value pmg_est of the consumed power value pmg_ex is calculated using a transfer function $\hat{T}_{MG}$ which is acquired by comparison between the command power value pmg_cm and the consumed power value pmg_ex in this embodiment. Here, the estimated value can be expressed by pmg_est=$\hat{T}_{MG}$·pmg_cm. A command power value pfc_cm of the fuel cell FC is calculated using the estimated value pmg_est.

The air compressor ACP is driven in accordance with a command power value pacp_cm output from the control unit ECU and consumes power of a consumed power value pacp_ex. Accordingly, when a true transfer function $T_{ACP}$ of the air compressor ACP is used, pacp_ex=$T_{ACP}$·pacp_cm is established. An estimated value pacp_est of the consumed power value pacp_ex is calculated using a transfer function $\hat{T}_{ACP}$ which is acquired by comparison between the command power value pacp_cm and the consumed power value pacp_ex in this embodiment. Here, the estimated value can be expressed by pacp_est=$\hat{T}_{ACP}$·pacp_cm. A command power value pfc_cm of the fuel cell FC is calculated using the estimated value pacp_est.

The water pump WP is driven in accordance with a command power value pwp_cm output from the control unit ECU and consumes power of a consumed power value pwp_ex. Accordingly, when a true transfer function $T_{WP}$ of the water pump WP is used, pwp_ex=$T_{WP}$·pwp_cm is established. An estimated value pwp_est of the consumed power value pwp_ex is calculated using a transfer function $\hat{T}_{WP}$ which is acquired by comparison between the command power value pwp_cm and the consumed power value pwp_ex in this embodiment. Here, the estimated value can be expressed by pwp_est=$\hat{T}_{WP}$·pwp_cm. A command power value pfc_cm of the fuel cell FC is calculated using the estimated value pwp_est.

The hydrogen pump HP is driven in accordance with a command power value php_cm output from the control unit ECU and consumes power of a consumed power value pgp_ex. Accordingly, when a true transfer function $T_{HP}$ of the hydrogen pump HP is used, php_ex=$T_{HP}$·php_cm is established. An estimated value php_est of the consumed power value php_ex is calculated using a transfer function $\hat{T}_{HP}$ which is acquired by comparison between the command power value php_cm and the consumed power value php_ex in this embodiment. Here, the estimated value can be expressed by php_est=$\hat{T}_{HP}$·php_cm. A command power value pfc_cm of the fuel cell FC is calculated using the estimated value php_est.

The auxiliary machine AUX is driven in accordance with a command power value paux_cm output from the control unit ECU and consumes power of a consumed power value paux_ex. Accordingly, when a true transfer function $T_{AUX}$ of the auxiliary machine AUX is used, paux_ex=$T_{AUX}$·paux_cm is established. An estimated value paux_est of the consumed power value paux_ex is calculated using a transfer function $\hat{T}_{AUX}$ which is acquired by comparison between the command power value paux_cm and the consumed power value paux_ex in this embodiment. Here, the estimated value can be expressed by paux_est=$\hat{T}_{AUX}$·paux_cm. A command power value pfc_cm of the fuel cell FC is calculated using the estimated value paux_est.

In this embodiment, the transfer functions $\hat{T}_{MG}$, $\hat{T}_{ACP}$, $\hat{T}_{WP}$, $\hat{T}_{HP}$, and $\hat{T}_{AUX}$ are fixed values which are not updated, and a nominal value of previous data or a value selected from a map in consideration of temperatures or behavior of the loads can be used.

A total amount of consumed power Pout is a sum of consumed power values of the loads and is expressed by Equation 8.

$$P_{out} = \text{pmg\_ex} + \text{pacp\_ex} + \text{pwp\_ex} + \text{php\_ex} + \text{paux\_ex}$$
$$= T_{MG} \cdot \text{pmg\_cm} + T_{ACP} \cdot \text{pacp\_cm} + T_{WP} \cdot \text{pwp\_cm} +$$
$$T_{HP} \cdot \text{php\_cm} + T_{AUX} \cdot \text{paux\_cm}$$
Equation 8

On the other hand, the fuel cell FC generates power in accordance with a command power value pfc_cm output from the control unit ECU and actually generates power of a generated power value pfc_ex. Accordingly, when a true transfer function $T_{FC}$ of the fuel cell FC is used, pfc_ex=$T_{FC}$·pfc_cm is established. Accordingly, an amount of generated power $P_{in}$ of the fuel cell FC is expressed by Equation 9.

$$P_{in} = \text{pfc\_ex} = T_{FC} \cdot \text{pfc\_cm}$$
Equation 9

An amount of charging-discharging power $P_{BAT}$ of the secondary battery BAT is a difference between the total amount of consumed power $P_{out}$ and the amount of generated power $P_{in}$ of the fuel cell FC as expressed by Equation 10.

$$P_{BAT} = P_{out} - P_{in}$$
$$= T_{MG} \cdot \text{pmg\_cm} + T_{ACP} \cdot \text{pacp\_cm} + T_{WP} \cdot \text{pwp\_cm} +$$
$$T_{HP} \cdot \text{php\_cm} + T_{AUX} \cdot \text{paux\_cm} - T_{FC} \cdot \text{pfc\_cm}$$
Equation 10

When the total amount of consumed power $P_{out}$ is greater than the amount of generated power of the fuel cell FC and the amount of charging-discharging power $P_{BAT}$ has a positive value, shortage power is discharged from the secondary battery BAT. On the other hand, when the total amount of consumed power $P_{out}$ is less than the amount of generated power $P_{in}$ of the fuel cell FC and the amount of charging-discharging power $P_{BAT}$ has a negative value, the secondary battery BAT is charged with excess power.

Here, in order to minimize deterioration of the secondary battery BAT, the amount of charging-discharging power $P_{BAT}$ of the secondary battery BAT needs to be maintained between a discharging power limit value Wout and a charging power limit value Win. Accordingly, the control unit ECU generates the command power value pfc_cm of the fuel cell FC and controls power generation of the fuel cell FC such that the amount of charging-discharging power $P_{BAT}$ of the secondary battery BAT is maintained at a predetermined value.

Specifically, as illustrated in FIG. 1, the command power value pfc_cm of the fuel cell FC is determined by dividing a resultant value by the transfer function $\hat{T}_{FC}$ of the fuel cell FC, the resultant value being obtained by subtracting a command power value $p_{bat}$_cm of the secondary battery BAT from the sum of the estimated values of the consumed power values of the loads. That is, the command power value pfc_cm of the fuel cell FC is expressed by Equation 11.

$$\text{pfc\_cm} = \frac{\text{pmg\_est} + \text{pacp\_est} + \text{pwp\_est} + \text{php\_est} + \text{paux\_est} - \text{pbat\_cm}}{\hat{T}_{MG}} =$$
$$\frac{\hat{T}_{MG} \cdot \text{pmg\_cm} + \hat{T}_{ACP} \cdot \text{pacp\_cm} + \hat{T}_{WP} \cdot \text{pwp\_cm} + \hat{T}_{HP} \cdot \text{php\_cm} + \hat{T}_{AUX} \cdot \text{paux\_cm} - \text{pbat\_cm}}{\hat{T}_{FC}}$$
Equation 11

Here, the command power value $p_{bat}$_cm of the secondary battery BAT is determined by the control unit ECU such that a state of charge (SOC) of the secondary battery BAT is maintained within a predetermined range and fuel efficiency is optimized to calculate the command power value pfc_cm of the fuel cell FC. The SOC is calculated, for example, based on a charging-discharging current value ibat of the secondary battery illustrated in FIG. 5. The transfer function $\hat{T}_{FC}$ is acquired, for example, through data comparison between a previous command power value pfc_cm and a generated power value pfc_ex. The transfer function $\hat{T}_{FC}$ in this embodiment is a fixed value which is not updated and a nominal value of previous data or a value selected from a map in consideration of temperature or behavior can be used.

When Equation 11 is substituted into Equation 10, the amount of charging-discharging power $P_{BAT}$ of the secondary battery BAT is expressed by Equation 12.

$$P_{BAT} = \left(T_{MG} - \frac{T_{FC}}{\hat{T}_{FC}}\hat{T}_{MG}\right)\text{pmg\_cm} +$$
$$\left(T_{ACP} - \frac{T_{FC}}{\hat{T}_{FC}}\hat{T}_{ACP}\right)\text{pacp\_cm} +$$
$$\left(T_{WP} - \frac{T_{FC}}{\hat{T}_{FC}}\hat{T}_{WP}\right)\text{pwp\_cm} + \left(T_{HP} - \frac{T_{FC}}{\hat{T}_{FC}}\hat{T}_{HP}\right)\text{php\_cm} +$$
$$\left(T_{AUX} - \frac{T_{FC}}{\hat{T}_{FC}}\hat{T}_{AUX}\right)\text{paux\_cm} + \frac{T_{FC}}{\hat{T}_{FC}}\text{pbat\_cm}$$
Equation 12

Here, in an ideal state, when the transfer function of each term in Equation 12 matches a true transfer function and $\hat{T}_{MG}=T_{MG}$, $\hat{T}_{ACP}=T_{ACP}$, $\hat{T}_{WP}=T_{WP}$, $\hat{T}_{HP}=T_{HP}$, $\hat{T}_{AUX}=T_{AUX}$, and $\hat{T}_{FC}=T_{FC}$ are established, Equation 13 is obtained.

$$P_{BAT} = P_{out} - P_{in} = \text{pbat\_cm}$$
Equation 13

That is, since the amount of charging-discharging power $P_{BAT}$ of the secondary battery BAT matches a command power value pbat_cm, it is possible to easily maintain the amount of charging-discharging power $P_{BAT}$ between the discharging power limit value Wout and the charging power limit value Win.

Figure 5:
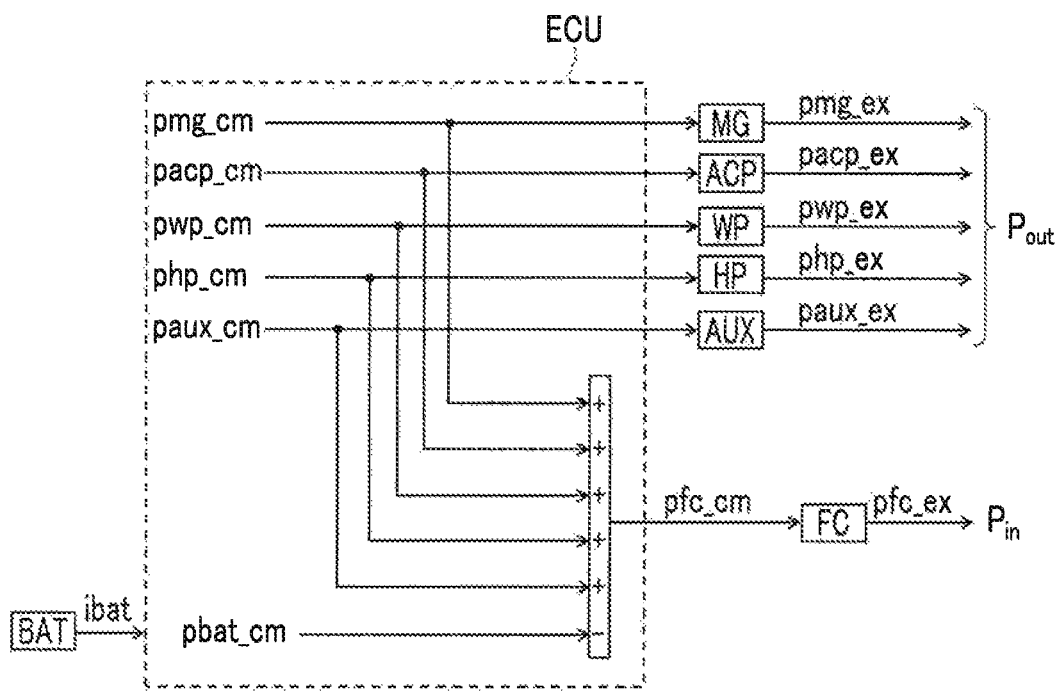
FIG. 5 is a control block diagram of a fuel cell system for a vehicle according to the related art of the disclosure.
Figure 6:
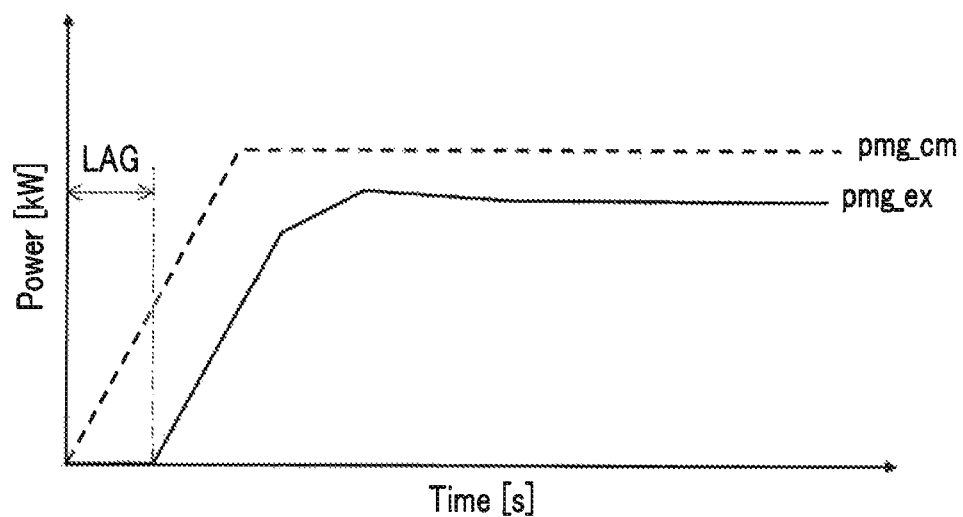
FIG. 6 is a graph illustrating response characteristics of a motor MG according to the related art, where a command power value pmg_cm and a consumed power value pmg_ex are illustrated for comparison.

In the fuel cell system for a vehicle illustrated in FIG. 5, as expressed by Equation 4, a value obtained by simply subtracting the command power value pbat_cm of the secondary battery BAT from the sum of the command power values (for example, pmg_cm) of the loads is used as the command power value pfc_cm of the fuel cell FC. Accordingly, as illustrated in FIG. 6, when a difference is generated between the command power value (for example, pmg_cm) and the consumed power value (for example pmg_ex) in each load at the time of rising or a steady state, the amount of charging-discharging power $P_{BAT}$ of the secondary battery BAT cannot be maintained between the discharging power limit value Wout and the charging power limit value Win.

On the contrary, in the fuel cell system for a vehicle according to this embodiment, as expressed by Equation 11, the consumed power value (for example, pmg_ex) is estimated from the command power value (for example, pmg_cm) using the transfer function (for example, $T\char`\^_{MG}$) for each of the loads such as the motor MG and the command power value pfc_cm of the fuel cell FC is determined by dividing the resultant value by the transfer function $T\char`\^_{FC}$ of the fuel cell FC, the resultant value being obtained by subtracting the command power value pbat_cm of the secondary battery BAT from the sum of the consumed power values (for example, pmg_est) estimated for the loads.

Accordingly, in Equation 12, the transfer function in each term is approximated to a true transfer function and the amount of charging-discharging power $P_{BAT}$ of the secondary battery BAT can be approximated to the command power value pbat_cm. As a result, it is possible to easily maintain the amount of charging-discharging power $P_{BAT}$ between the discharging power limit value Wout and the charging power limit value Win and to suppress overcharging or overdischarging in the secondary battery BAT.

Second Embodiment

Figure 2:
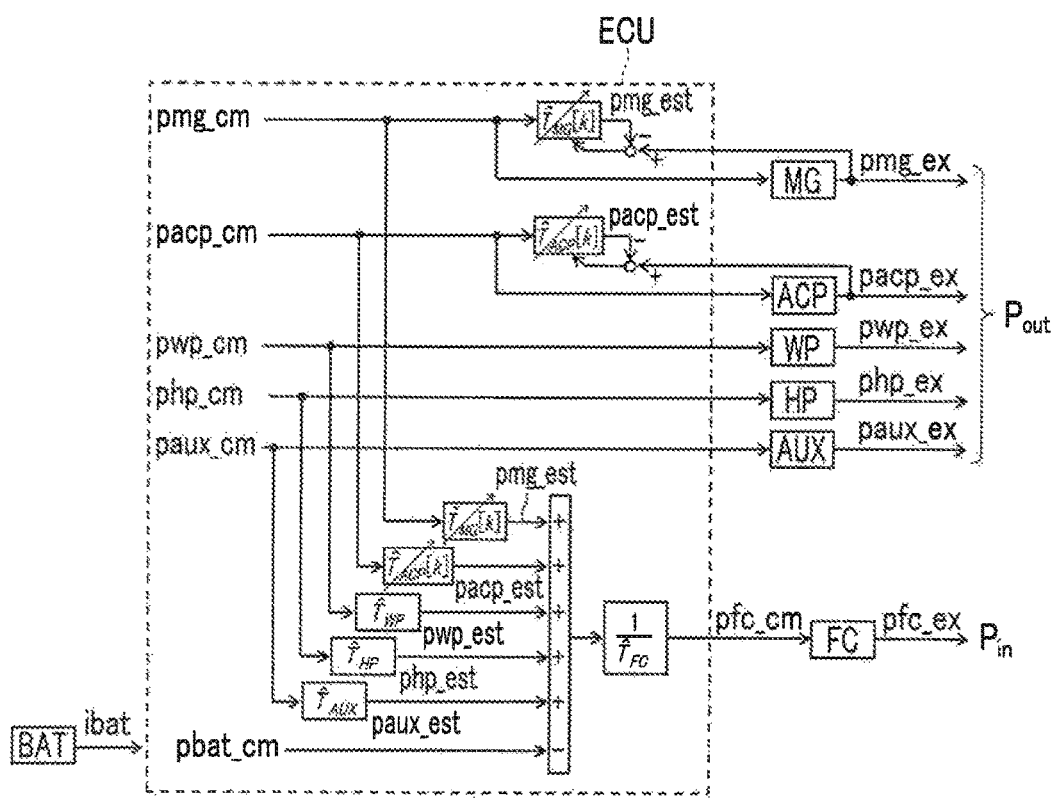
FIG. 2 is a control block diagram of a fuel ell system for a vehicle according to a second embodiment.

A fuel cell system for a vehicle according to a second embodiment will be described below with reference to FIG. 2. FIG. 2 is a control block diagram of the fuel cell system for a vehicle according to the second embodiment. In the fuel cell system for a vehicle according to the first embodiment, the transfer functions $T\char`\^_{MG}$, $T\char`\^_{ACP}$, $T\char`\^_{WP}$, $T\char`\^_{HP}$, and $T\char`\^_{AUX}$ are fixed values which are not updated. On the other hand, as illustrated in FIG. 2, in the fuel cell system for a vehicle according to the second embodiment, the transfer functions $T\char`\^_{MG}$ and $T\char`\^_{ACP}$ of the motor MG and the air compressor ACP having a large amount of consumed power are sequentially updated and set to be variable.

As illustrated in FIG. 2, the control unit ECU outputs a command power value pmg_cm to the motor MG and a consumed power value pmg_ex output from the motor MG based on the command power value pmg_cm is fed back to the control unit ECU. The control unit ECU compares the fed-back consumed power value pmg_ex with the output command power value pmg_cm and sequentially updates the transfer function $T\char`\^_{MG}[k]$ (where k denotes the number of times of calculation, that is, the number of times in which data is acquired) whenever data of the consumed power value pmg_ex is acquired. More specifically, the control unit ECU updates the value of the transfer function $T\char`\^_{MG}[k]$ using a value obtained by subtracting the estimated value pmg_est ($=T\char`\^_{MG}[k]\cdot$pmg_cm) from the consumed power value pmg_ex.

Similarly, the control unit ECU outputs a command power value pacp_cm to the air compressor ACP and a consumed power value pacp_ex output from the air compressor ACP based on the command power value pcp_cm is fed back to the control unit ECU. The control unit ECU compares the fed-back consumed power value pacp_ex with the output command power value pacp_cm and sequentially updates the transfer function $T\char`\^_{ACP}[k]$ whenever data of the consumed power value pacp_ex is acquired. More specifically, the control unit ECU updates the value of the transfer function $T\char`\^_{ACP}[k]$ using a value obtained by subtracting the estimated value pacp_est ($=T\char`\^_{ACP}[k]\cdot$pacp_cm) from the consumed power value pacp_ex. The initial values $T\char`\^_{MG}[1]$ and $T\char`\^_{ACP}[1]$ of the transfer functions are set in the same ways as in the first embodiment.

In this way, in the fuel cell system for a vehicle according to the second embodiment, the transfer functions $T\char`\^_{MG}$ and $T\char`\^_{ACP}$ of the motor MG and the air compressor ACP are sequentially updated. Accordingly, in Equation 12, the transfer functions $T\char`\^_{MG}$ and $T\char`\^_{ACP}$ of the motor MG and the air compressor ACP can be approximated to the true transfer functions $T_{MG}$ and $T_{ACP}$ and the amount of charging-discharging power $P_{BAT}$ of the secondary battery BAT can be more closely approximated to the command power value pbat_cm. As a result, in comparison with the fuel cell system for a vehicle according to the first embodiment, the amount of charging-discharging power $P_{BAT}$ can be more easily maintained between the discharging power limit value Wout and the charging power limit value Win and it is possible to further suppress overcharging or overdischarging in the secondary battery BAT. The configuration other than described above is the same as in the fuel cell system for a vehicle according to the first embodiment and thus detailed description thereof will not be repeated.

The transfer functions $T\char`\^_{WP}$, $T\char`\^_{HP}$, and $T\char`\^_{AUX}$ of the water pump WP, the hydrogen pump HP, and the auxiliary machine AUX which are the other loads may be sequentially updated in the same way, but a circuit configuration of the control unit ECU becomes complicated accordingly.

On the other hand, when the transfer function $T\char`\^_{FC}$ of the fuel cell FC for calculating the command power value pfc_cm is sequentially updated in the same way, a circular operation occurs in the course of calculating the command power value pfc_cm and the generated power value pfc_ex becomes destabilized. Accordingly, when the transfer function $T\char`\^_{FC}$ of the fuel cell FC is updated, it is preferable that a moving average value of the sequentially updated transfer function $T\char`\^_{FC}$ be used or a value at the time of a previous calculation, that is, $T\char`\^_{FC}[k-1]$, be used. When a size of a step of the moving average increases, the generated power value pfc_ex is stabilized, but a separation between the transfer function $T\char`\^_{FC}$ and the true transfer function $T_{FC}$ is increased and an effect of suppressing overcharging or overdischarging in the secondary battery BAT is reduced.

Third Embodiment

Figure 3:
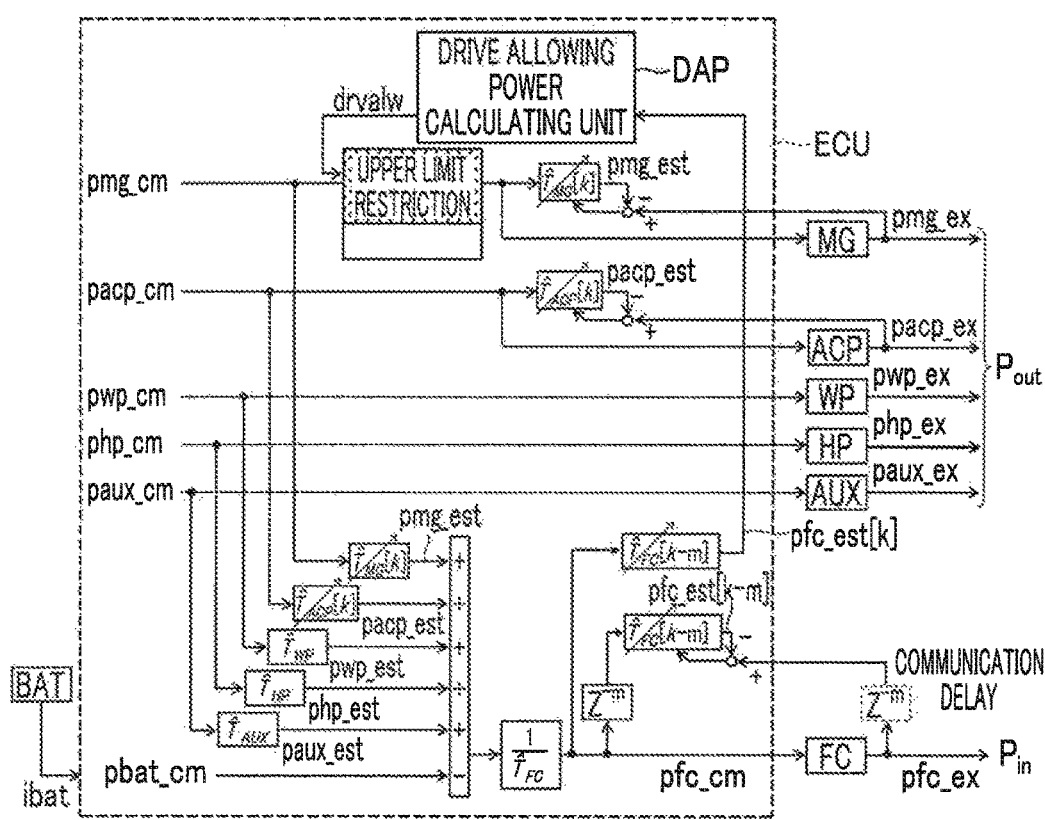
FIG. 3 is a control block diagram of a fuel cell system for a vehicle according to a third embodiment.

A fuel cell system for a vehicle according to a third embodiment will be described below with reference to FIG. 3. FIG. 3 is a control block diagram of the fuel cell system for a vehicle according to the third embodiment. In the fuel cell system for a vehicle according to the third embodiment, similarly to the fuel cell system for a vehicle according to the second embodiment, the estimated value pfc_est of the generated power value pfc_ex is calculated using the sequentially updated transfer function (a second transfer function) $T\char`\^_{FC}$ of the fuel cell FC while the transfer function (a first transfer function) $T\hat{}_{FC}$ of the fuel cell FC for calculating the command power value pfc_cm of the fuel cell FC is set to a fixed value.

Specifically, as illustrated in FIG. 3, the control unit ECU calculates the command power value pfc_cm of the fuel cell FC and outputs the calculated command power value to the fuel cell FC, and the generated power value pfc_ex output from the fuel cell FC based on the command power value pfc_cm is fed back to the control unit ECU. Here, at the time of feedback of the generated power value from the fuel cell FC to the control unit ECU, a communication delay corresponding to in times of calculation occurs.

Therefore, in order to synchronize signals to be compared, the control unit ECU compares the fed-back generated power value pfc_ex with the command power value pfc_cm [k-m] output before m times of calculation and sequentially updates the transfer function $T\hat{}_{FC}[k-m]$ whenever data of the generated power value pfc_ex is acquired. More specifically, the control unit ECU updates the value of the transfer function $T\hat{}_{FC}[k-m]$ using a value obtained by subtracting the estimated value pfc_est[k-m] (=$T\hat{}_{FC}[k-m]$·pfc_cm[k-m]) from the fed-back generated power value pfc_ex.

The control unit ECU calculates the product of the command power value pfc_cm[k] at the current time point and the transfer function $T\hat{}_{FC}[k-m]$, that is, $T\hat{}_{FC}[k-m]$·pfc_cm[k], as the estimated value pfc_est[k] of the generated power value pfc_ex at the current time point. A drive allowing power calculating unit DAP calculates a drive allowing power value drvalw based on the estimated value pfc_est[k] and provides an upper limit restriction in the command power value pmg_cm of the motor MG.

For example, the drive allowing power value drvalw can be calculated to be a value obtained by subtracting a sum of the consumed power value pacp_ex (or the estimated value pacp_est) of the air compressor ACP, the consumed power value pwp_ex (or the estimated value pwp_est) of the water pump WP, the consumed power value php_ex (or the estimated value php_est) of the hydrogen pump HP, and the consumed power value paux_ex (or the estimated value paux_est) of the auxiliary machine AUX at the current time point from a sum of the estimated value pfc_est of the fuel cell FC and the command power value pbat_cm of the secondary battery BAT at the current time point.

Here, since the transfer function $T\hat{}_{FC}$ of the fuel cell FC for calculating the command power value pfc_cm of the fuel cell FC is set to a fixed value, there is a likelihood that a separation between the transfer function $T\hat{}_{FC}$ and the true transfer function $T_{FC}$ will increase and an effect of suppressing overcharging or overdischarging in the secondary battery BAT will be reduced.

Therefore, in the fuel cell system for a vehicle according to the third embodiment, the estimated value pfc-est[k] of the generated power value pfc_ex is calculated using the sequentially updated transfer function $T\hat{}_{FC}[k-m]$ of the fuel cell FC and the upper limit restriction is provided for the command power value pmg_cm of the motor MG. Accordingly, it is possible to suppress overdischarging in the secondary battery BAT. The other configuration is the same as in the fuel cell system for a vehicle according to the second embodiment and thus detailed description thereof will not be repeated.

Modified Example of Third Embodiment

Figure 4:
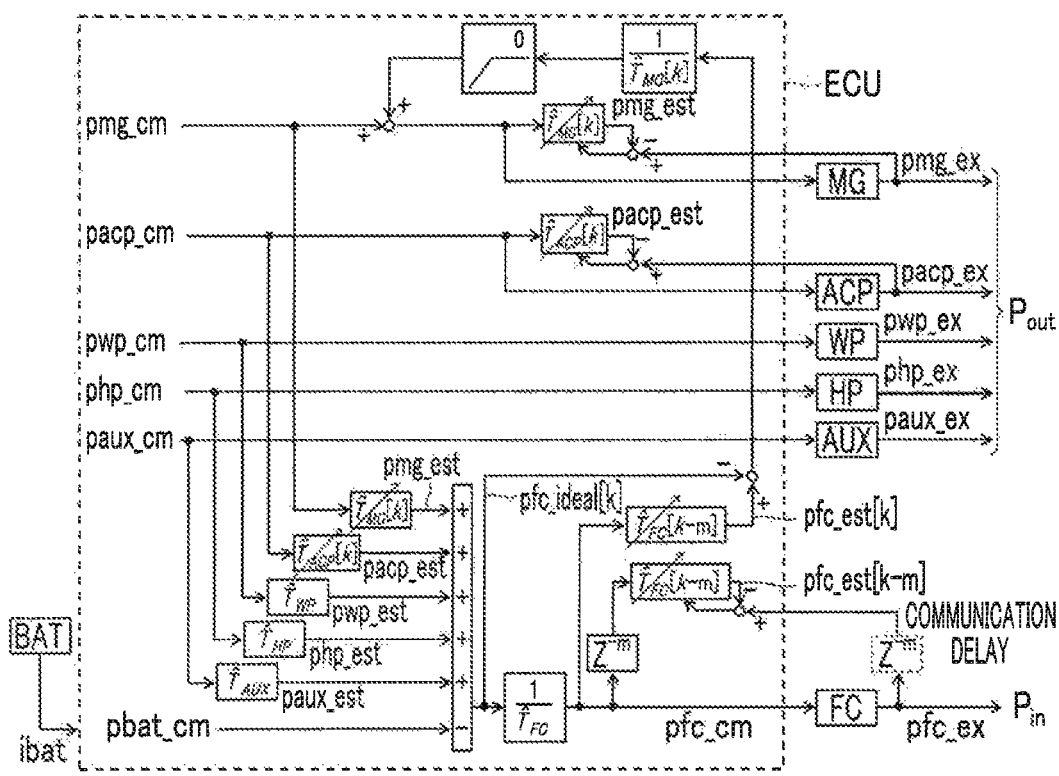
FIG. 4 is a control block diagram of a fuel cell system for a vehicle according to a modified example of the third embodiment.

A fuel cell system for a vehicle according to a modified example of the third embodiment will be described below with reference to FIG. 4. FIG. 4 is a control block diagram of the fuel cell system for a vehicle according to the modified example of the third embodiment, hi the fuel cell system for a vehicle according to the modified example of the third embodiment, similarly to the fuel cell system for a vehicle according to the third embodiment, the control unit ECU calculates the product of the command power value pfc_cm[k] at the current time point and the transfer function $T\hat{}_{FC}[k-m]$, that is, $T\hat{}_{FC}[k-m]$·pfc_cm[k], as the estimated value pfc_est[k] of the generated power value pfc_ex[k] at the current time point.

As illustrated in FIG. 4, in this modified example, a value obtained by subtracting the command power value pbat_cm of the secondary battery BAT from a sum of the estimated value pmg_est of the consumed power value of the motor MG, the estimated value pacp_est of the consumed power value of the air compressor ACP, the estimated value pwp_est of the consumed power value of the water pump WP, the estimated value php_est of the consumed power value of the hydrogen pump HP, and the estimated value paux_est of the consumed power value paux_ex of the auxiliary machine AUX at the current time is calculated as an ideal generated power value pfc_ideal[k] of the fuel cell FC. A value obtained by dividing pfc_est[k]−pfc_ideal[k] which is a difference between the estimated value pfc_est[k] of the generated power value and the ideal generated power value pfc_ideal[k] of the fuel cell FC at the current time point by the transfer function $T\hat{}_{MG}[k]$ of the motor MG, that is, (pfc_est[k]−pfc_ideal[k])/$T\hat{}_{MG}[k]$, is added to the command power value pmg_cm of the motor MG. Here, when this value is equal to or greater than 0, the value is not added to the command power value pmg_cm of the motor MG.

With this configuration, the upper limit of the command power value pmg_cm of the motor MG is restricted. Accordingly, for the same reason as in the third embodiment, it is possible to suppress overdischarging in the secondary battery BAT. The value of pfc_est[k] pfc_ideal[k] may be added to the command power value pmg_cm of the motor MG without dividing pfc_est[k]−pfc_ideal[k] by the transfer function $T\hat{}_{MG}[k]$ of the motor MG. The other configuration is the same as in the fuel cell system for a vehicle according to the third embodiment and thus detailed description thereof will not be repeated.

The disclosure is not limited to the above-mentioned embodiments and can be appropriately modified without departing from the gist of the disclosure.

What is claimed is:

1. A fuel cell system for a vehicle comprising:
   a fuel cell;
   a plurality of loads that consumes power generated by the fuel cell and includes a vehicle driving motor;
   a secondary battery configured to be charged with excess power when an amount of power generated by the fuel cell is greater than an amount of power consumed by the loads and to discharge shortage power when the amount of power generated by the fuel cell is less than the amount of power consumed by the loads; and
   a control unit configured to control the amount of power generated by the fuel cell such that an amount of charging-discharging power of the secondary battery is maintained at a predetermined value,
   wherein the control unit is configured to estimate a consumed power value using a transfer function from a command power value for each of the loads,
   wherein the control unit is configured to determine a command power value of the fuel cell by dividing a resultant value by a first transfer function of the fuel cell, the resultant value being obtained by subtracting a command power value of the secondary battery from a sum of the consumed power values estimated for the loads,
wherein the control unit is configured to compare an actual generated power value of the fuel cell with a generated power value of the fuel cell estimated using a second transfer function of the fuel cell and to sequentially update the second transfer function of the fuel cell, and
wherein the control unit is configured to restrict an upper limit of a command power value of the motor based on the command power value of the fuel cell at a current time point and the generated power value of the fuel cell at the current time point estimated using the updated second transfer function of the fuel cell.

2. The fuel cell system for a vehicle according to claim 1, wherein the control unit is configured to compare an actual consumed power value of the motor with the estimated consumed power value of the motor and to sequentially update the transfer function of the motor.

3. The fuel cell system for a vehicle according to claim 1, wherein the control unit is configured to restrict the upper limit of the command power value of the motor based on a difference between the estimated generated power value of the fuel cell at the current time point and an ideal generated power value of the fuel cell obtained by subtracting the command power value of the secondary battery from a sum of the consumed power values estimated for the loads.

4. A control method of a fuel cell system for a vehicle, the fuel cell system including a fuel cell, a plurality of loads that consumes power generated by the fuel cell and includes a vehicle driving motor, and a secondary battery configured to be charged with excess power when an amount of power generated by the fuel cell is greater than an amount of power consumed by the loads and to discharge shortage power when the amount of power generated by the fuel cell is less than the amount of power consumed by the loads, and controlling the amount of power generated by the fuel cell such that an amount of charging-discharging power of the secondary battery is maintained at a predetermined value, the control method comprising:
estimating a consumed power value using a transfer function from a command power value for each of the loads;
determining a command power value of the fuel cell by dividing a resultant value by a first transfer function of the fuel cell, the resultant value being obtained by subtracting a command power value of the secondary battery from a sum of the consumed power values estimated for the loads;
comparing an actual generated power value of the fuel cell with a generated power value of the fuel cell estimated using a second transfer function of the fuel cell and sequentially updating the second transfer function of the fuel cell; and
restricting an upper limit of a command power value of the motor based on the command power value of the fuel cell at a current time point and the generated power value of the fuel cell at the current time point estimated using the updated second transfer function of the fuel cell.

* * * * *